United States Patent [19]

Orii et al.

[11] Patent Number: 5,048,151
[45] Date of Patent: Sep. 17, 1991

[54] MECHANICAL DOOR CHECK

[75] Inventors: Makoto Orii; Katsuhiko Hayashi; Teruaki Imai, all of Nagano, Japan

[73] Assignee: K.K. Sankyo Seiki Seisakusho, Nagano, Japan

[21] Appl. No.: 403,525

[22] Filed: Sep. 6, 1989

Related U.S. Application Data

[63] Continuation-in-part of Ser. No. 216,476, Jul. 8, 1988, abandoned.

[30] Foreign Application Priority Data

Sep. 6, 1988 [JP] Japan .................... 62-223304

[51] Int. Cl.$^5$ .............................................. E05F 3/00
[52] U.S. Cl. ............................................ 16/64; 16/49
[58] Field of Search ........................... 16/49, 79, 64

[56] References Cited

U.S. PATENT DOCUMENTS

| 581,972 | 5/1897 | Wright | 16/49 |
| 696,116 | 3/1902 | Taylor | 16/49 |
| 1,918,879 | 7/1933 | Welton | 16/64 |

Primary Examiner—Robert L. Spruill
Assistant Examiner—Carmine Cuda
Attorney, Agent, or Firm—Sughrue, Mion, Zinn, Macpeak & Seas

[57] ABSTRACT

Herein disclosed is a continuous speed change type door check for closing a door, which comprises: a pivot pin made rotatable; a slider adapted to be linearly moved by the rotations of the pivot pin and to rotate the pivot pin when it returns; a coil spring for biasing the slider to return; a gear train for speeding up the rotations of the pivot pin; a brake connected to the gear train; and a one-way transmission clutch for operating the brake in a direction to close the door.

19 Claims, 9 Drawing Sheets

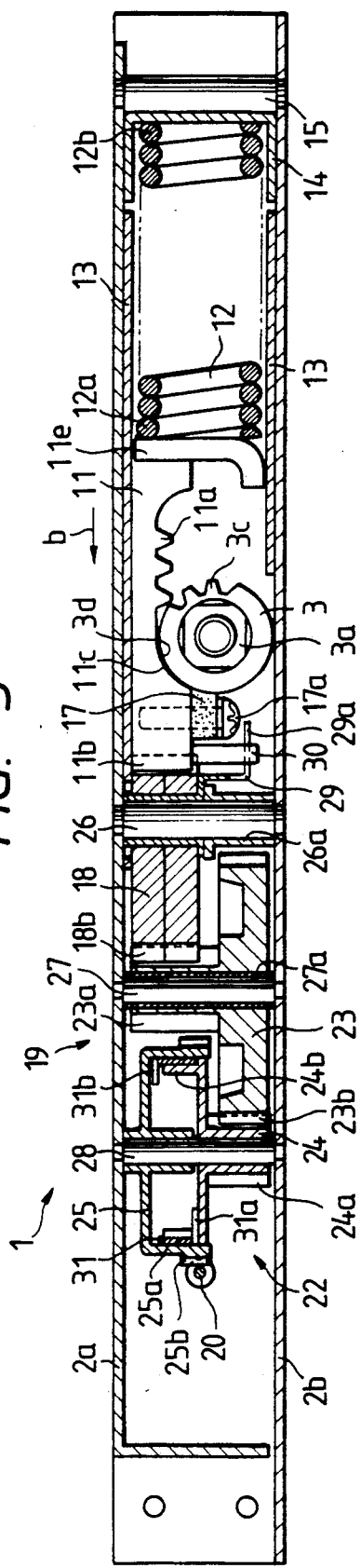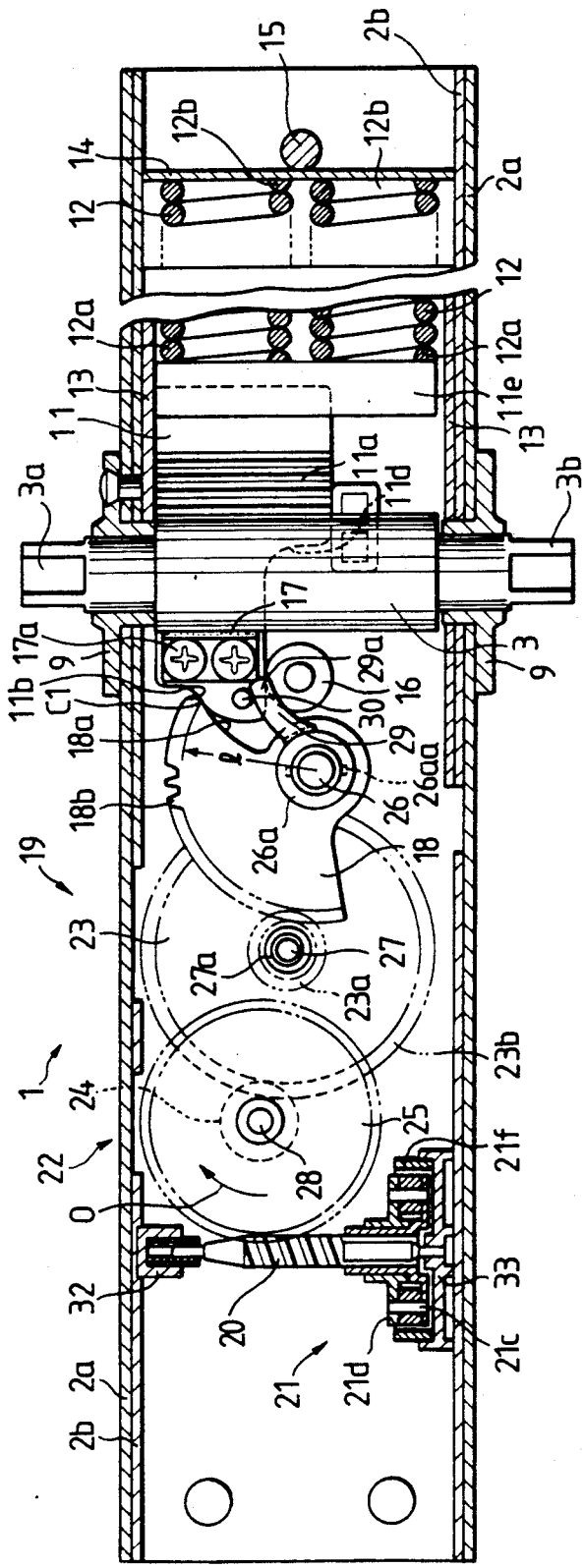
FIG. 3
FIG. 4

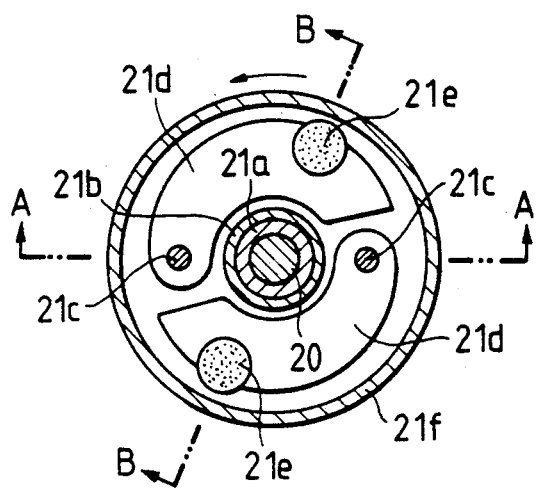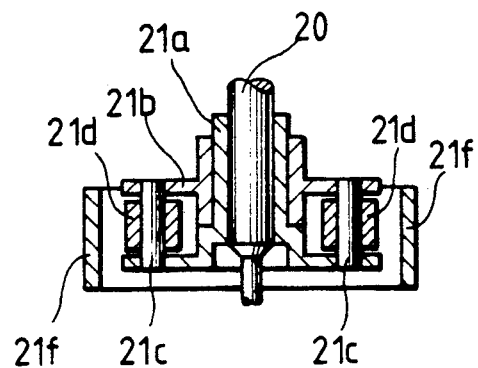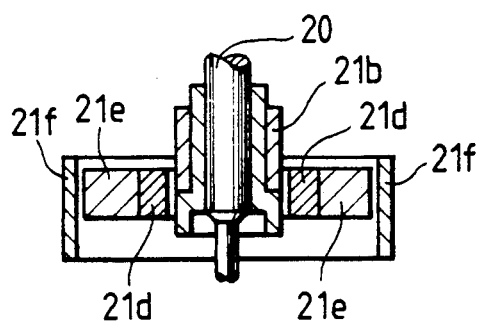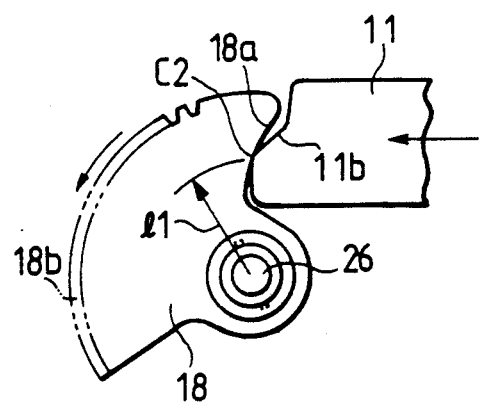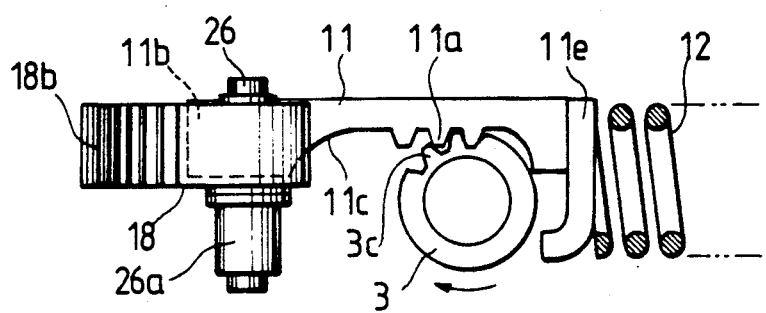

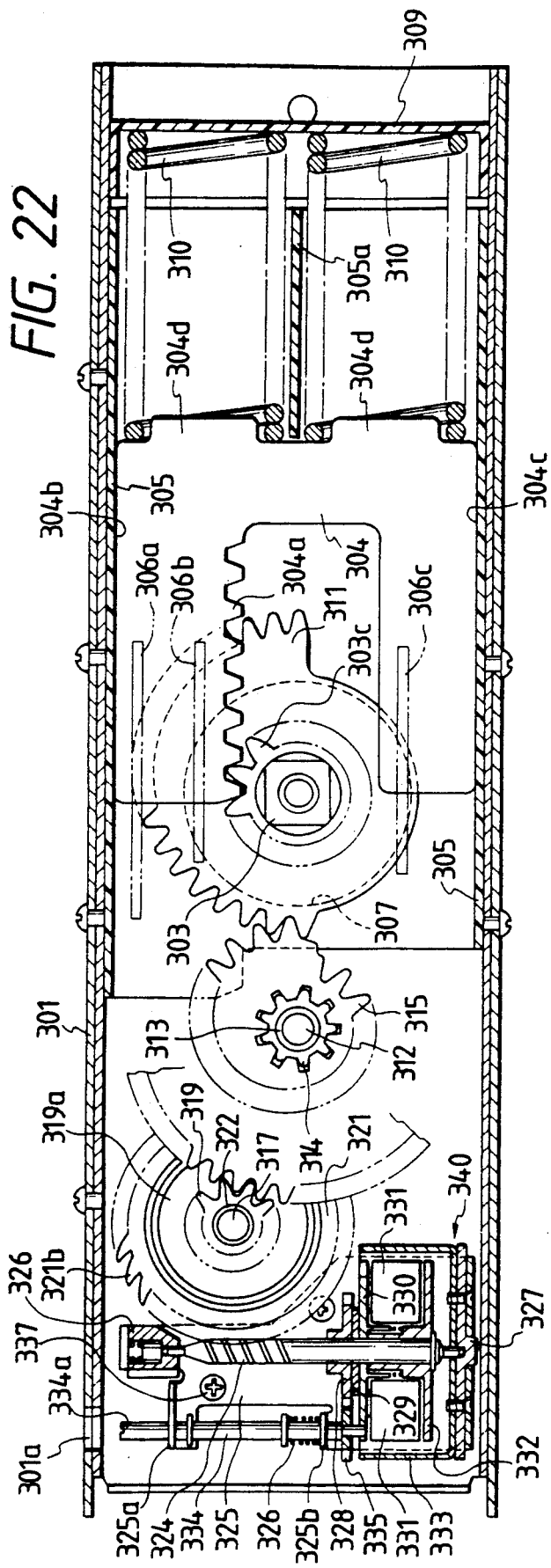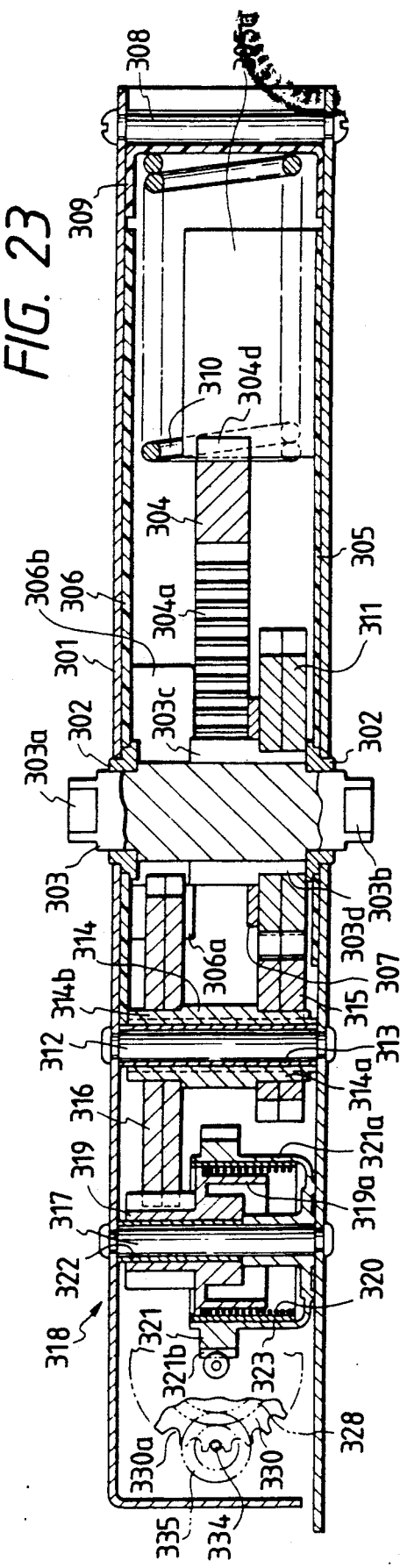

MECHANICAL DOOR CHECK

This is a continuation-in-part of application No. 07/216,476, filed July 8, 1988 now abandoned.

BACKGROUND OF THE INVENTION

1. Field of the Invention

The present invention relates to a door check for automatically closing an open door and, more particularly, to a continuous speed change type door check for closing the door at a continuously changing speed.

2. Description of the Prior Art

Most frequently practised in the prior art is an oil cylinder type door check in which a piston is slidably fitted in a cylinder having a spring and a working fluid or oil confined therein so that the spring may be energized when the door is opened whereas the flow resistance is utilized to provide a damping effect when the door is closed.

Another door check is proposed in Japanese Patent Publication No. 52-21810, for example. This is the so-called "mechanical door check", in which a spring is energized when the door is opened whereas its releasing force is speeded up by a speed up gear train composed of multiple spur gears when the door is closed, and in which the damping effect is established by the use of a mechanical (or centrifugal) governor. Also disclosed in Japanese Patent Publication No. 52-3227 is a mechanical door check which uses a coil spring. We also have disclosed another mechanical check in application U.S. Pat. No. 157,665.

The oil cylinder type door closer establishes the damping effect by the use of the flow resistance of the oil confined in the cylinder so that its damping effect will disperse depending upon the change in the temperature. Specifically, at a high temperature, the viscosity of the oil will drop to reduce the flow resistance so that the door closing speed is accelerated. At a low temperature, on the contrary, the flow resistance is increased to decelerate the door closing speed. As a result, the oil cylinder type door check of the prior art must have its door closing speed adjusted. Another defect of the oil cylinder type is that the confined oil will leak raising a durability problem. Since, moreover, there has to be prepared a casing which includes a cylinder capable of enduring high spring force and oil pressure, another problem is that the door check itself must have a large size and weight. This heavy weight will make it troublesome to mount the door check.

On the other hand, the mechanical door check is freed from the problems of the dispersion in the damping effect accompanying the temperature change and the oil leakage. However, the overall construction is enlarged because a predetermined speed up ratio cannot be attained unless the number of gears to be interposed between the spring and the governor is large. If the speed up gear train is composed of multiple spur gears, there arise other problems in that the gear train has to be elongated and that the noises of the gears are high when the door is opened or closed.

SUMMARY OF THE INVENTION

An object of the present invention is to provide a door checker which is freed from both the dispersion in the damping effect due to the changing temperature and the oil leakage and which is simply constructed to reduce the noises accompanying the opening or closing operation of the door.

According to the present invention, there is provided a door check for closing a door, which comprises: a pivot pin made rotatable; a slider adapted to be linearly moved by the rotations of said pivot pin and to rotate said pivot pin when it returns; a coil spring for biasing said slider to return; a gear train for speeding up the rotations of said pivot pin; brake means connected to said gear train; and a one-way transmission clutch for operating said brake means in a direction to close said door.

More specifically, the door check according to the present invention comprises: a pivot pin connected through an arm to a door frame and made rotatable in response to the opening or closing operation of a door; a slider adapted to be linearly moved by the rotations of the pivot pin for rotating the pivot pin when it returns; a gear train for speeding up the rotations of the pivot pin; brake means connected to the gear train; a return coil spring adapted to be energized when the slider is moved in a direction to open the door; and a one-way transmission clutch for operating the brake means in a direction to close the door.

When the door is opened, the pivot pin is rotated to move the slider in the door opening direction thereby to energize the return coil spring. Following the movement of the slider, the transmission gears are rotated. If the door opening operation is released, the slider is moved by the energized force of the return coil spring so that the pivot pin is rotated to close the door. The slider to be moved by the return coil spring rotates the transmission gears. The rotations of the transmission gears will rotate a worm at a high speed through the speed up gear train and the one-way transmission clutch. If the worm is rotated at a high speed, the brake means applies its braking force to the rotations of the worm and accordingly the braking slider, i.e., the rotations of the pivot pin rotated by the slider so that the closing speed of the door is adjusted.

BRIEF DESCRIPTION OF THE DRAWINGS

Other objects, features and advantages of the present invention will become apparent from the following description to be made in connection with the embodiments thereof with reference to the accompanying drawings, in which:

FIG. 3 is a sectional top plan view showing the first embodiment of the present invention when the continuous speed change door check is in the door opening position;

FIG. 4 is a longitudinal section showing the same;

FIG. 5 is a sectional top plan view showing brake means;

FIG. 6 is a section taken along line A—A of FIG. 5;

FIG. 7 is a section taken along line B—B of FIG. 5;

FIG. 8 is a side elevation showing the positional relation between a slider and a transmission member just before the door comes to its closed position;

FIG. 9 is a top plan view showing the relative positions of the slider and a pivot pin when the door is in its closed state;

FIG. 22 is a horizontal sectional view of a door check which is an embodiment of the present invention.

FIG. 23 is a vertical sectional view of the door check.

DESCRIPTION OF THE PREFERRED EMBODIMENTS

The present invention will be described in detail in the following in connection with the embodiments thereof with reference to the accompanying drawings.

First of all, a continuous speed change type thin door check will be described with reference to FIGS. 1 to 11.

Figure 1:
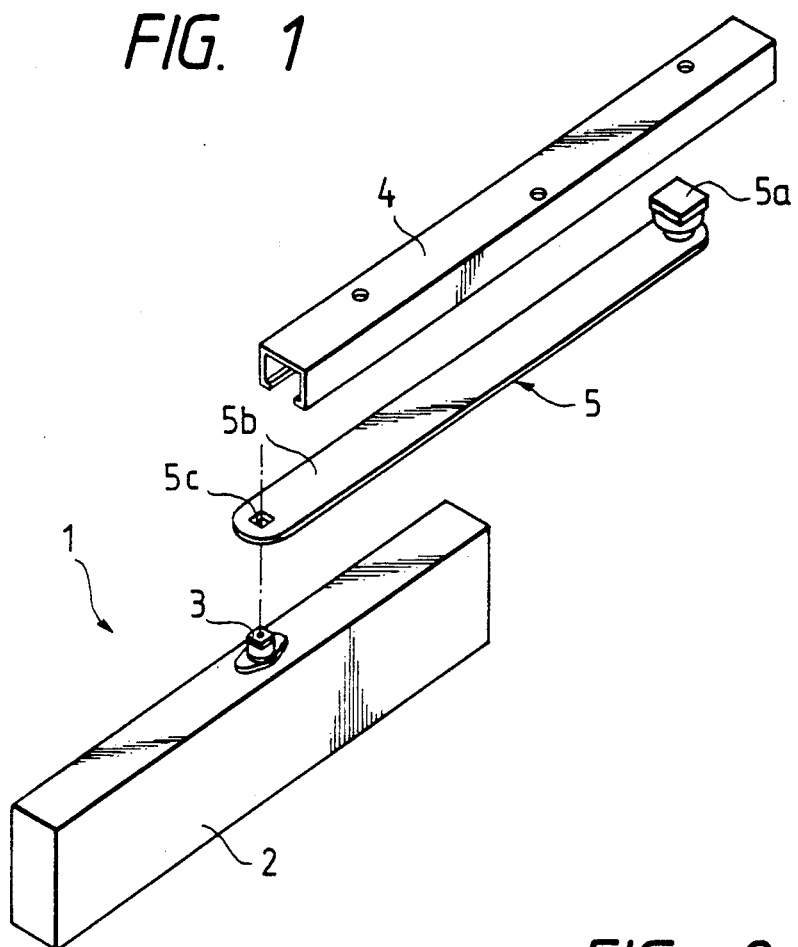
FIG. 1 is a perspective view showing the profile of a continuous speed change door check according to a first embodiment of the present invention.
Figure 2:
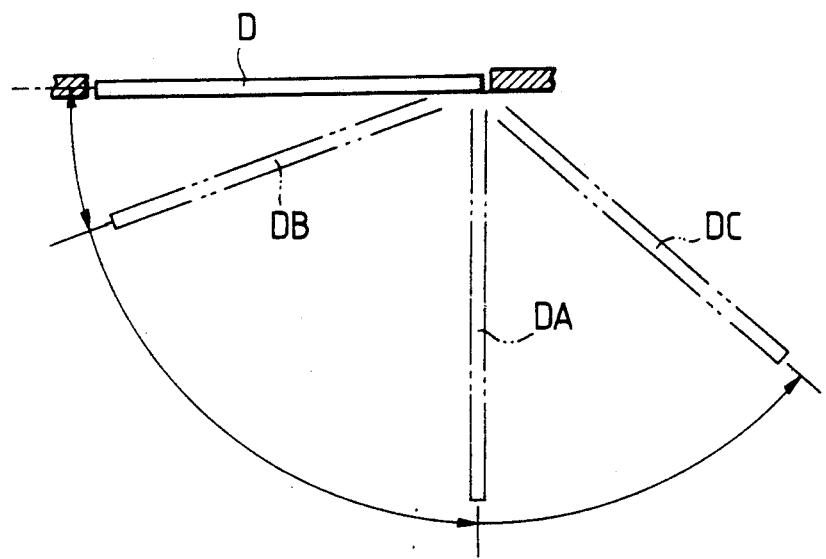
FIG. 2 is a top plan view showing a plurality of open positions of the door by way of example.

In FIG. 1 showing an embodiment of the present invention, a built-in type door check 1 is constructed of a frame 2, an pivot pin 3 borne rotatably in the frame 1 and having a journal projecting therefrom, and various components to be described hereinafter. The frame 2 is fixedly mounted in a recess which is formed in the upper end portion of a door D (as shown in FIG. 2). On the door frame (not shown), there is fixed a guide rail 4 which has a section of an inverted "U". In the guide rail 4, there is slidably fitted a slider 5a which is pivotally mounted on one end of an arm 5. The other end 5b of this arm 5 is formed with a square hole 5c, through which it is connected to the projecting end of the pivot pin 3.

Turning to FIGS. 3 and 4, the frame 2 is composed of walls 2a and 2b overlapping each other. These frame walls 2a and 2b are fixed to each other by means of screws (not shown).

Generally at the center of the frame 2, there is arranged the pivot pin 3 which has its rotating center axis extending vertically. This pivot pin 3 is made of a metal, considering the load to be applied thereto, and is rotatably borne in bearings 9 and 9 which are fixed on the frame 2. The journals 3a and 3b of the pivot pin 3 projecting from the frame 2 are formed into a square shape, and the former one 3a is fitted in the square hole 5c of the arm 5 (as shown in FIG. 1). The pivot pin 3 is formed with a tooth portion 3c and a column portion 3d which has a diameter substantially equal to the addendum circle of the tooth portion 3c.

In the frame 2, there is slidably fitted a metallic slider 11. As better seen from FIG. 9, this slider 11 is formed with: a rack portion 11a meshing with the tooth portion 3c of the pivot pin 3; a cam portion 11b formed at one end portion thereof for abutting against a later-described transmission member; a non-rack portion 11c for engaging with the column portion 3d of the pivot pin 3 at its position where a spring 12 has been biased; and an engagement portion 11d capable of engaging with a guide 16. To the other end portion of the slider 11 located at the end formed with the cam portion 11b, there is fixed a spring seat 11e for receiving one end 12a of the spring 12. Between the inner side of the plate-shaped frame 2 and the slider 11, there is sandwiched a spacer 13 which is made of a synthetic resin to lighten the frictional resistance between the metallic components.

The spring 12 is composed of two spring elements which are vertically juxtaposed to each other such that their other ends 12b and 12b are received by a receiving plate 14. This receiving plate 14 in turn is supported by a stay 15 which is fixed on the frame 2. The springs 12 and 12 are so pre-compressed as to bring the latch of the door into engagement.

Figure 11:
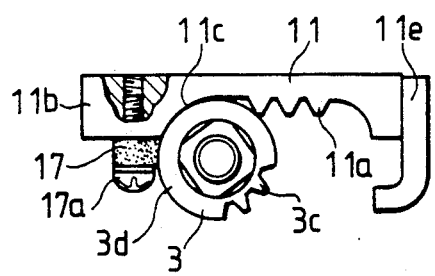
FIG. 11 is a top plan view showing the state in which the door is stopped at an arbitrary position.

To the slider 11, as also shown in FIG. 11, there is fixed by two screws 17a and 17a a brake member 17 which is to be brought into abutment against the column portion 3d of the pivot pin 3 when the door is opened a predetermined angle.

In the frame 2, there are mounted: a transmission member 18 which is formed with a cam portion 18a abutting against the cam portion 11b of the slider 11 and a larger-diameter tooth portion 18b; a speed up gear train 19 for speeding up the movement of the slider 11; a worm shaft 20 meshing with the final gear of the speed up gear train 19; brake means 21 mounted on the worm shaft 20; and clutch means for allowing the brake means 21 the movement of the slider 11 only in the door opening direction. The speed up gear train 19 is composed of the tooth portion 18b of the transmission member 18, a double gear 23, a smaller-diameter gear 24 and a worm wheel 25. And, these gears are arranged in a horizontal direction and borne rotatably by pivot pins 26, 27 and 28 which have their respective two ends caulked to the frame 2. On the pivot pins 26 and 27, there are rotatably fitted sleeves 26a and 27a which are made of a synthetic resin.

Figure 10:
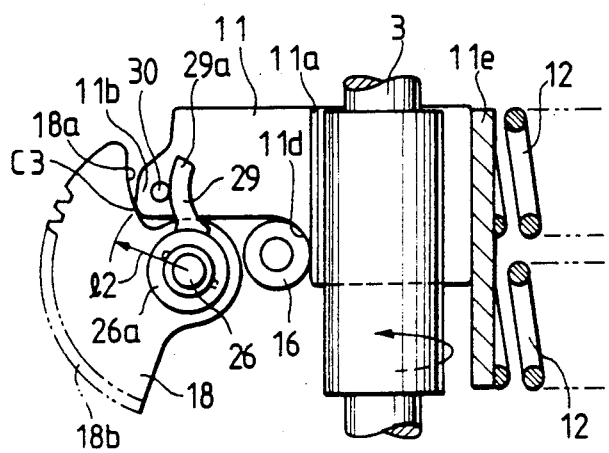
FIG. 10 is a front elevation of FIG. 9.

The transmission member 18 is made substantially integral with the sleeve 26a. On this sleeve 26a, there is integrally fitted a return lever 29. This lever 29 engages at its leading end 29a with a pin 30, which is anchored at the slider 11, to turn the transmission member 18 clockwise (as viewed in FIG. 10) following the movement of the slider 11 when in the door opening operation, as will be described hereinafter. Incidentally, the return lever 29 may be replaced by a spring for biasing the transmission member 18 (as modified in FIG. 17). Moreover, the transmission member 18 of the shown embodiment is prepared by laying two pressed plates one on the other and by bringing the notches formed in the inner edges of the center holes of those plates into engagement with the projections 26aa of the sleeve 26a so that the two plates are integrated in the rotating direction. The cam portion 18b abuts against the cam portion 11b of the linearly moving slider 11 and has its abutting point shifted in accordance with the rotational position of the transmission member 18. As shown in FIG. 4, the abutting point between the cam portion 18a of the transmission member 18 and the cam portion 11b of the slider 11 is located at a distance l from the pivot pin 26 providing the center of rotations of the transmission member 18. When the door is opened to a position of about 20 degrees (as indicated at DB in FIG. 2) from its closed position (as indicated at D in FIG. 2), the abutting point of the two cam portions 18a and 11b is positioned at a distance l1 (<l), as seen from FIG. 8. When the door is in its closed position D, the abutting point of the two cam portions 18a and 11b is positioned at a distance l2 (<l1), as shown in FIG. 10. That is to say, the abutting point of the cam portions 18a and 11b comes closer to the pivot pin 26 as the opening angle of the door becomes smaller. In other words, the rotating speed of the transmission member 18 to be pushed by the slider 11 is gradually accelerated, as the abutting point of the two cam portions comes closer to the pivot pin 26.

The double gear 23 is a speed up gear which is formed with a smaller-diameter tooth portion 23a meshing with the tooth portion 18b of the transmission member 18 and a larger-diameter tooth portion 23b. This tooth portion 23b meshes with a tooth portion 24a of the small gear 24.

This small gear 24 and the worm wheel 25 constitute together the clutch means 22. The small gear 24 is formed with a sleeve 24b retaining one end 31a of a coil spring 31 which is wound thereon. The worm wheel 25 has a sleeve 25a enclosing the sleeve 24b and formed with a tooth portion 25b on its outer circumference. The coil spring 31 is biased to expand to contact with the inner circumference of the sleeve 25a while leaving its free end 31b free from the sleeve 25a. When the small diameter 24 rotates in the direction of arrow a, the coil spring 31 is wound up to transmit none of the rotations of the sleeve 24b to the sleeve 25a. When the small gear 24 rotates in the direction opposite to the arrow o, the coil spring 31 is loosened to allow the rotations of the sleeve 24b to be transmitted to the sleeve 25a, i.e., the worm wheel 25. As a result, the rotations of the transmission member 18 are speeded up and transmitted to the worm wheel 25. Incidentally, the clutch means should not be limited to the shown example but may adopt another type if the aforementioned operations are retained.

The worm shaft 20 is rotatably borne at its two ends by means of bearings 32 and 33 which are fixed on the frame 2 through shock absorbing members of rubber or the like to reduce the noises.

Turning to FIGS. 4 to 7, the brake means 21 is composed of: a pair of arms 21d and 21d borne in a rocking manner through pins 21c and 21c by holders 21a and 21b press-fitted on the worm 20; high-friction members 21e and 21e press-fitted on the outer edges of the arms 21d and 21d near the free ends thereof; and a braking ring 21f surrounding the arms 21d and 21d. The ring 21f is fixed in the bearing member 33. When the worm 20 is rotated at a high speed, the arms 21d and 21d are expanded by the centrifugal force established to bring the high-friction members 21e and 21e into sliding contact with the inner circumference of the ring 21f thereby to brake the rotations of the worm 20. In order to establish the centrifugal force sufficiently, the arms 21d are made of a metal or a material having a mass near that of the metal. Moreover, the high-friction member 21e is made of rubber or the like, which has a high friction resistance and an excellent wear resistance. Incidentally, the brake means 21 should not be limited to the shown example but may use friction arms made of feathers or friction arms made of elastically deformable rubber, or a variety of governor mechanisms of eddy current electromagnetic or brake shoe types.

The door check according to the present embodiment can be made thin, as shown, so that it can be built in a sash door.

The operations of the embodiment thus constructed will be described in the following.

The door check shown in FIGS. 3 and 4 are in the state where the door is opened about 90 degrees, as indicated at DA in FIG. 2. In this state, the slider 11 is pushed by the tooth portion 3c of the pivot pin 3 against the elastic force of the springs 12 to have its non-rack portion 11c facing the column portion 3d. At this time, the springs 12 are energized to bias the slider 11 in a door closing direction (i.e., leftwardly of FIGS. 3 and 4). At this time, moreover, the cam portion 11b of the slider 11 and the cam portion 18a of the transmission member 18 are in abutment against each other in a position C1 which is at the radius l from the pivot pin 26.

Now, if the door DA opened about 90 degrees is released from its opening operation, as shown in FIG. 2, the pivot pin 3 has its tooth portion 3c meshing with the rack portion 11a of the slider 11, which is biased by the springs 12 to move in the direction of arrow b (as shown in FIG. 3), so that it is rotated counter-clockwise. The rotations of the pivot pin 3 turn the door through the arm 5 (as shown in FIG. 1) to the door closing position, as indicated at D in FIG. 2.

When the slider 11 is moved in the door closing direction, the transmission member 18 having its cam portion 18a abutting against the cam portion 11b of the slider 11 is rotated in the direction of the arrow, as shown in FIG. 8. The rotations of the transmission member 18 are transmitted, as shown in FIGS. 3 and 4, through the double gear 23 to the small gear 24 to rotate the small gear 24 in the direction opposite to the arrow o, as shown in FIG. 4. When the small gear 24 rotates, its sleeve 24b expands the coil spring 31 to rotate the sleeve 25a together with the worm wheel 25 at a high speed. In other words, the clutch means is applied, when the door is to be closed, so that the worm wheel 25 rotates the worm shaft 20 at a high speed. Then, the arms 21d are expanded by the centrifugal force so that the high friction members 21e frictionally slides on the inner circumference of the ring 21f to brake the rotations of the worm shaft 20. This braking force in turn brakes the driving speed up gear train 19. The braking force thus applied to the speed up gear train 19 in turn brakes the rotations of the pivot pin 3 meshing with the slider 11. This braking force in turn brakes the rotations of the door being closed.

Now, the braking force of the brake means 21 is released when the arm portions 21a are released from their frictional sliding contact with the ring 21b as the rotations of the worm shaft 20 drop. When the r.p.m. of the worm shaft 20 exceeds a predetermined number, the braking operation is started. This braking operation is released when the r.p.m. of the worm shaft 20 drops.

Figure 12:
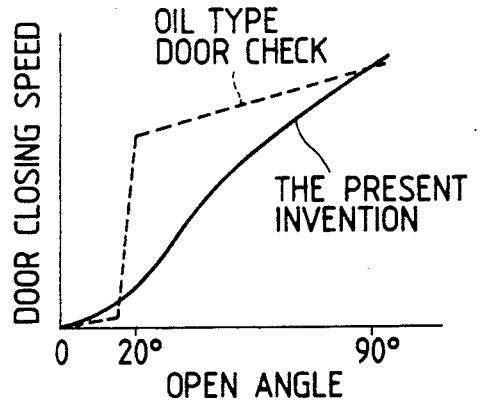
FIG. 12 is a diagram plotting the relations between the door opening position and the door closing speed.

Now, according to the door checker of the present invention, the door closing speed is continuously changed, as plotted by a solid curve in FIG. 12. This door closing speed, i.e,. the rotating speed of the pivot pin 3 is determined by the moving speed of the slider 11. With the door being opened about 90 degrees, as shown in FIG. 4, the cam portion 11b of the slider 11 and the cam portion 18a of the transmission member 18 are in abutment against each other at the position C1 spaced the distance l1 from the pivot pin 26. As shown in FIG. 8, on the other hand, the abutting point of those two cam portions are positioned at a point C2 of the distance l when the door is closed to the opening angle of 20 degrees. The slider 11 is braked when it is moved in the door closing direction, as has been described hereinbefore. However, the closing speed of the door from the angle of 90 degrees to an angle of about 20 degrees drops relatively steeply, as seen from FIG. 12. The abutting point between the cam portion 11b of the slider 11 and the cam portion 18a of the transmission member 18 comes closer to the center of rotations of the transmission member 18 as the door opening angle becomes smaller. As a result, the rotating angle of the transmission member 18 pushed by the slider 11 grows gradually larger as the door comes closer to its closed position. When the door is completely closed (as indicated at D in FIG. 2), as shown in FIG. 10, the two cam portions 11b and 18a are in abutment against each other at the closest distance l2 from the center of rotations of the transmission member 18. The abutting point of those two cam portions change most abruptly from the position C2 just before the closed position of FIG. 8, in which the opening angle is about 20 degrees, to the closed position C3 of FIG. 10, to speed up the rotations of the transmission member 18. As a result, the rotations of the transmission member 18 thus speeded up are further speeded up through the speed up gear train 19 and transmitted to the worm shaft 20. As the r.p.m. of this worm shaft 20 rises, the braking force of the brake means 21 is increased to apply a high braking force to the rotations of the speed up gear train 19 and the transmission member 18, i.e., the moving speed of the slider 11 thereby decreases. As a result, an increased braking force is applied to the pivot pin 3 meshing with the rack portion 11a to slow down the door closing speed. As shown in FIG. 2, more specifically, the door rotating from the open position DB of the open angle of 20 degrees to the closed position D is slowly closed as the movement of the slider 11 is slowed down. The door closing speed, as plotted by the solid curve in FIG. 12, drops relatively steeply from the opening angle of 90 degrees to the opening angle of 20 degrees. However, what is plotted in FIG. 12 is only one model, and the door can be closed relatively promptly up to the opening angle of 20 degrees by suitably devising the shape of the cam portion 18a of the transmission member 18.

FIGS. 9 and 10 show the relative positions of the transmission member 18 and the slider 11 when the door is in its completely closed state (as indicated at D in FIG. 2). If the door is opened in this state, the pivot pin 3 is rotated in the direction of arrow to bring the slider meshing with its tooth portion 3c in the rightward or door opening direction, as shown, thereby to energize the springs 12. When the slider 11 is moved, it is followed by the return lever 29 engaging with the pin 30 to rotate the transmission member 18 clockwise. These rotations of the transmission member 18 rotate the speed up gear train 19, but are not transmitted to the worm wheel 25 because the coil spring 31 (as shown in FIG. 3) of the clutch means 22 is wound up. This means that the brake means 21 is inoperative when the door is opened.

In FIG. 3 showing the state in which the door is opened about 90 degrees, the slider 11 is in its position having the springs 12 energized and has its non-rack portion 11c facing the column portion 3d of the pivot pin 3. In this case, the slider 11 biased by the springs 12 have their movement blocked by having its rack portion 11a engaging with the column portion 3d. As a result, the slider 11 is disabled to rotate the pivot pin 3 so that it is blocked from its door closing operation. As a result, even if the pivot pin 3 is rotated more, that is, even if the door 90 degrees is opened more than 90 degrees, the slider 11 is not moved any more so that it does not close the door. If the door is opened 90 degrees or more, as indicated at DC in FIG. 2, the pivot pin 3 rotates independently at the non-rack portion 11c of the slider 11, as shown in FIG. 11, so that the door can be stopped at an arbitrary open position. In this state, moreover, the brake member 17 is in abutment against the circumference of the column portion 3d of the pivot pin 3. As a result, this pivot pin, i.e., the door is braked so that it can be stopped in an arbitrary position without fail. Since the brake member 17 is made of a material such as rubber having high friction and elasticity, it can be pressed and deformed to have its press-fit increased on the pivot pin 3 as the screws 7a and 17a are fastened into the slider 11. In other words, the degree of the stopping action upon the door at the arbitrary position can be adjusted by turning the screws 17a. Incidentally, the frame 2 is formed with not-shown inspection holes which are positioned to face the screws 17a.

The door DC is rotated from an arbitrary position of an opening angle of 90 degrees or more, as shown in FIG. 2, to the position indicated at DA if it is to be closed. Then, the rack portion 11c of the slider 11 and the tooth portion 3c of the pivot pin 3 come into engagement, as shown in FIG. 3, the slider 11 being biased by the springs 12 then rotates the pivot pin 3 in the direction to close the door. Incidentally, in case an inclining force is applied to the slider 11, the strengths of the two springs 12 can be made different to insure a balance.

Figure 13:
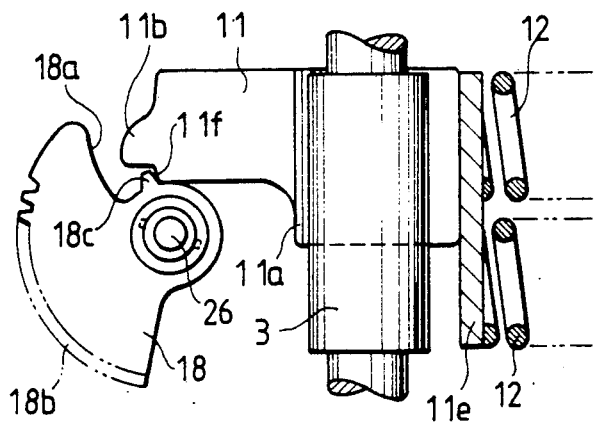
FIG. 13 is a side elevation showing the positional relations of the slider and the transmission member in the door closing position according to a second embodiment of the present invention.
Figure 14:
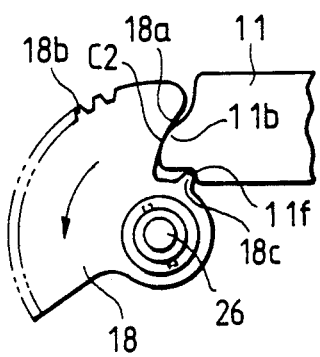
FIG. 14 is a side elevation showing an essential portion in the course of the door closing operation.
Figure 15:
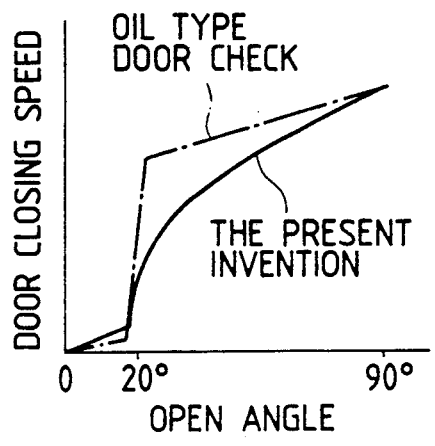
FIG. 15 is a diagram showing the relations between the door opening position and the door closing speed according to the second embodiment.

Next, another embodiment directed to a door check of double brake type will be described with reference to FIGS. 13 to 15. What is different from the foregoing embodiment is the push portion 11f formed on the slider 11 and the engagement portion 18c formed on the transmission member 18, but the remaining portions are kept identical so that they are not shown.

The operational differences will be described in the following. FIG. 14 shows the state in which the open door is in the course of its closure with the opening angle of 20 degrees. In this state, the cam portion 11b of the slider 11 pushes the cam portion 18a of the transmission member 18, and the push portion 11f begins to push the engagement portion 18c. As a result, the rotational angle of the transmission member 18 relative to the displacement of the slider 11 increases with the rotating speed of the worm 20 so that a strong braking force is applied to stop the door in the closed state of FIG. 13. In other words, the door is closed more slowly within the opening angle angle of 20 to 0 degrees. These relations are plotted in the diagram of FIG. 15, from which it is seen that the change-over is more gentle than that of the hydraulic type. Incidentally, this angle should not be limited to 20 degrees but may be set at a suitable value.

Figure 16:
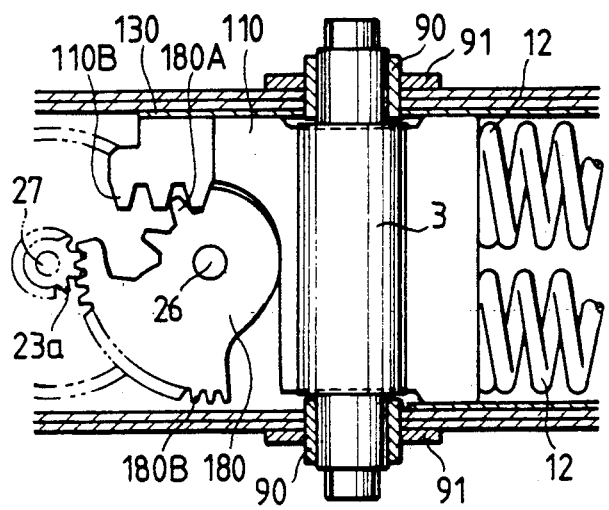
FIG. 16 is a side elevation showing an essential portion in the door closing position according to a third embodiment of the present invention.

FIG. 16 shows still another embodiment in which the transmission member is rotated by the rack of the slider. The pivot pin 3 is borne by a bearing 90, which is held by a bearing holder 91 fixed on the frame. The slider 110 is guided through a spacer 130 by the frame and is in meshing engagement like the foregoing embodiments by the pinion and the rack (although not shown). The slider 110 is formed with a downward rack portion 110B which meshes with a partial tooth portion 180A of a transmission member 180 within an open angle range of 0 to 90 degrees (as can be suitably set). The other partial tooth portion 180B meshes with a double gear 23a of the speed up gear train. The construction thus made can do without the return member (e.g., the lever 29, the pin 30 and so on) of the transmission member.

Figure 17:
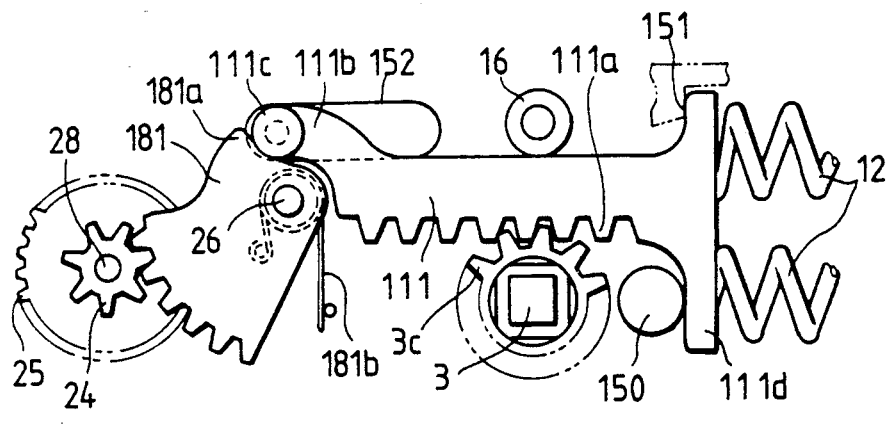
FIG. 17 is a top plan view showing an essential portion in the door closing position according to a fourth embodiment of the present invention.

FIG. 17 shows a further embodiment in which the slider is guided by a guide groove. The slider 111 is formed with a rack portion 111a, an end 111b, a rotatable roller 111c and a spring seat 111d. Reference numerals 150 and 151 designate seat receivers; numeral 152 a guide groove fitting the roller 111c therein; and numeral 16 a guide roller. A transmission member 181 is formed with a cam portion 181a and is biased to rotate clockwise by the action of a spring 181b.

The operations are similar to those of the aforementioned first embodiment such that the end 111b of the slider 111 abuts against the cam portion 181a to transmit the motions.

Figure 18:
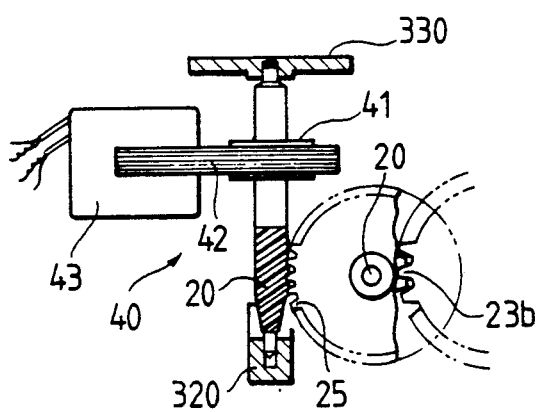
FIG. 18 is a diagram showing the structure of an essential portion in which brake means is exemplified by an electric power generator.
Figure 19:
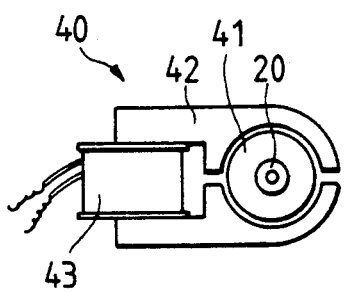
FIG. 19 is a top plan view showing a portion of FIG. 18.

FIGS. 18 and 19 show a further embodiment in which the brake means generates an electric power. The worm 20 fixes a magnet 41, which is enclosed by a yoke 42 fixed to the not-shown frame. In the yoke 41, there is fitted a generating coil 43 which constitutes a generator 40.

In operation, the worm 20 rotates at a high speed, when the door is being closed, so that an electromotive force is generated in the coil 43 to brake the door. Thus, the door is slowly closed. The electromotive force thus generated can operate a voice generating circuit, an electronic organ or a spot illuminator. Incidentally, in case the braking force is short, the brake means of the foregoing embodiments and the electric generator may be connected to the worm.

Figure 20:
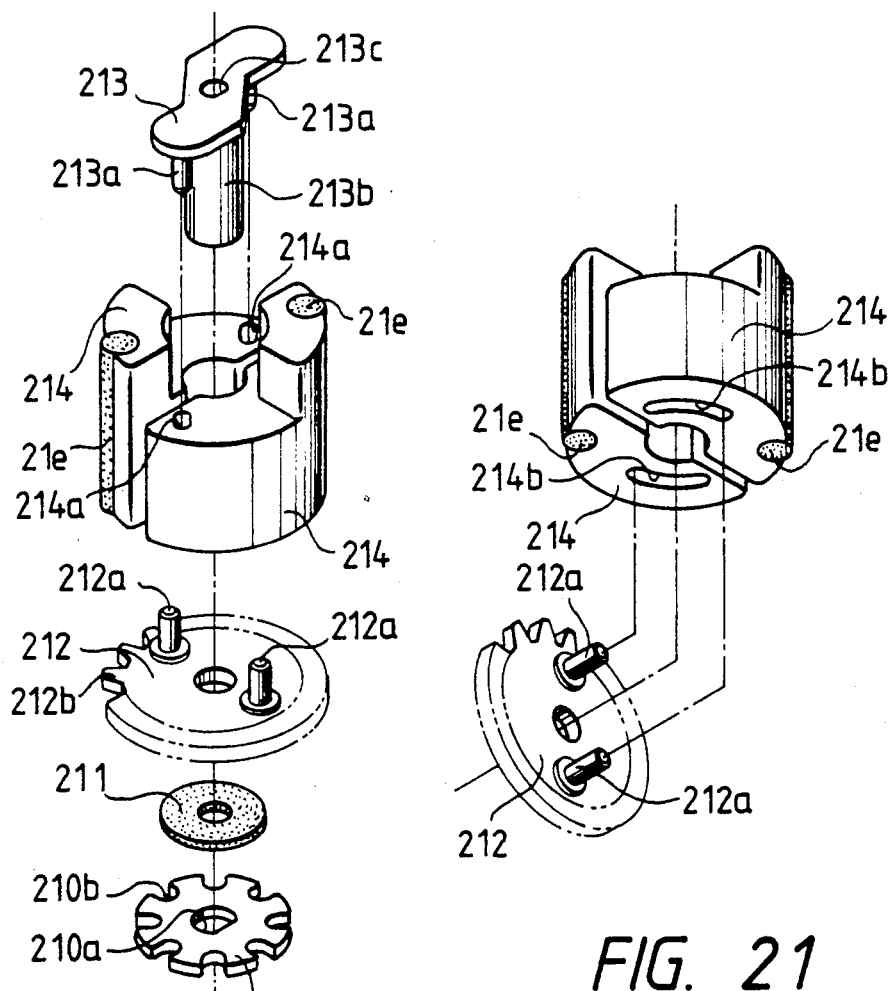
FIG. 20 is an exploded diagram showing the structure of a rotating portion of brake means which can have its speed adjusted.
Figure 21:
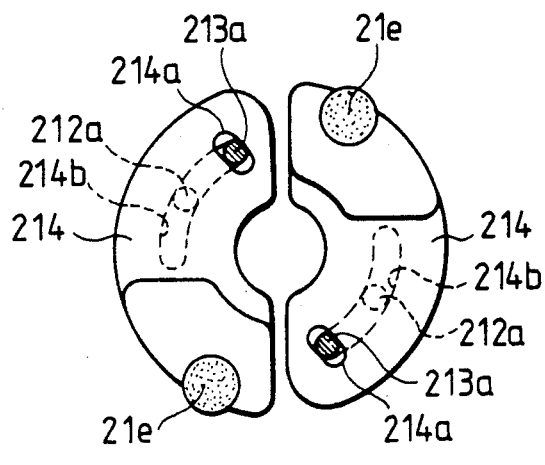
FIG. 21 is a top plan view showing an essential portion of the same.

FIGS. 20 and 21 show a further embodiment in which a speed adjusting function is added to the brake means. The worm 20 is formed with D-shaped cut portions 20a and 20c, a slender portion 20b and a groove 20d. In the D-shaped cut portion 20a, there are fitted a D-shaped hole 210a of a stopper 210 a friction ring 211 and an adjusting support member 212. A cylindrical portion 213b of a support member 213 is fitted in the slender portion 20b. A D-shaped hole 213c at the upper end is fitted in the D-shaped cut portion 20c so that it is prevented from any rotation. A not-shown stop ring is fitted in the groove 20d such that the cylindrical portion 213b has its leading end pushing the adjusting support member 212. With this assembly, two opposed pins 213a and 212a are attached to the support member 213 and the adjusting support member 212 and are fitted in the support groove 214a and adjusting groove 214b of a metallic weight 214. As a result, this weight 214 is made rotatable on the pin 212a. Like the foregoing embodiments, the high friction members 21e are press-fitted in the weight 214. The support groove 214a regulates the position (taken in the worm rotating direction) of the weight 214 through the pin 213a and has a length to allow the rotations of the weight 214 on the pin 212a.

In operation, the weight 214 is rotated to expand around the pin 212a by the action of the centrifugal force, as the worm 20 is rotated, so that the high friction member 21 comes into sliding contact with the not-shown ring (as indicated at 21f) to establish the braking force. This force is determined by the centrifugal force of the weight 214, which in turn is determined by the position of the fulcrum 212a. In case this braking force is to be adjusted, the outer circumference 210b of the stopper 210 holds the support member 213 while rotating the outer circumference 212b of the adjusting support member 212. Since this member 212 is held on the friction ring 211 by the support member 213, it is allowed to rotate on the worm, if it is rotated by a force stronger than that holding force. Then, the position of the pin 212a in the adjusting groove 214b and accordingly the fulcrum position of the weight 214 are changed. As a result, the centrifugal force is changed to vary the door closing speed.

FIG. 21 shows the state of an intermediate speed, which is dropped (with the centrifugal force being increased), if the pin 212a is rotated clockwise, but is increased if counter-clockwise. Moreover, an inspection hole may be formed in the frame to adjust the speed of the completed product of the door checker.

Incidentally, in the embodiments shown, the description has been made assuming that the angle for closing the door automatically is 90 degrees. It should naturally be understood that the present invention be not limited to such angular value. Moreover, the shown embodiments have been exemplified by the door check of door built-in type, but the present invention may be extended to a door check of external type, which is to be fixed on the surface of a door. Still moreover, the door can be slowly opened by a spring force and can be closed by human hands, if a one-way clutch is operated in the reverse direction or if the pivot pin moves the slider in the door closing direction toward the coil spring. Furthermore, the slider and the transmission member may be interconnected through a link. In case, on the other hand, the door is broken if a strong external force is applied in the door closing direction, overload preventing means such as a torque limiter may be added to the speed up gear train.

As has been described hereinbefore, according to the present invention, it is possible to eliminate the problems such as the oil leakage or the inferior temperature characteristics as in the hydraulic type door of the prior art. The door check of the present invention can take place of the hydraulic type door check. As has been described in connection with the various embodiments, moreover, the door can be lightly opened by the one-way transmission clutch with a variety of additional functions of reduced noises, small thickness, speed change or adjustment or electric power generation.

Another embodiment of the present invention is hereafter described.

Figure 24:
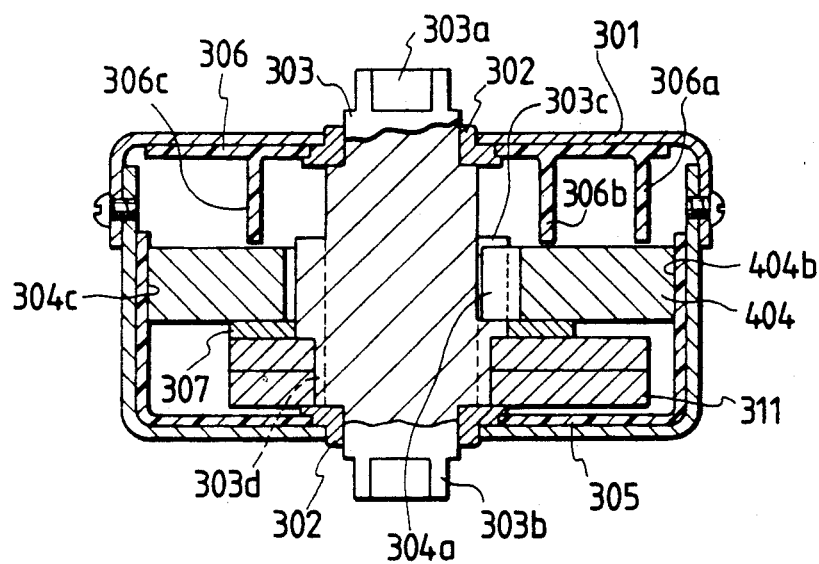
FIGS. 24 and 25 are cross-sectional views of major parts of the door check.
Figure 25:
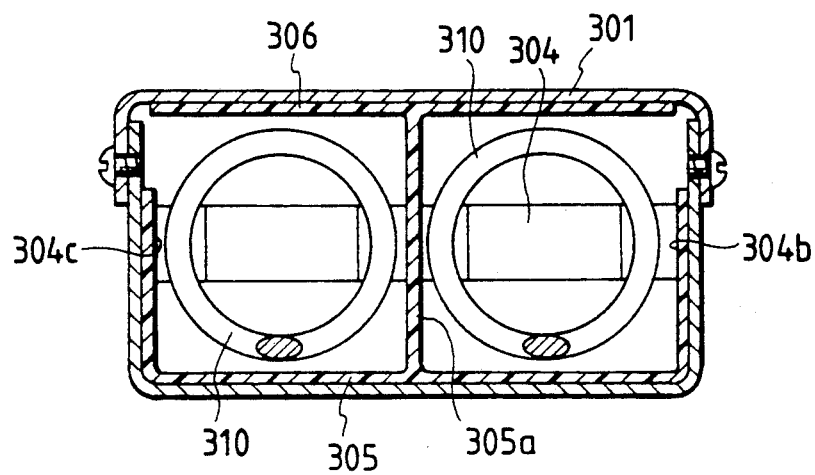

FIGS. 22, 23, 24 and 25 show a door check which is the embodiment. In the door check, a pivot pin 303 is rotatably supported by a pair of bearings 302 nearly in the central portion of a case 301 shaped as a rectangular parallelepiped and composed of two channel-shaped members secured to each other by screws. The case 301 is secured to an appropriate portion of a door not shown in the drawings. The pivot pin 303 projects at both the ends thereof from the case 1, and is coupled to a doorframe (not shown in the drawings) through a link engaged with one end of the pivot pin but not shown in the drawings. The pivot pin 303 is formed with a pinion 303c on the nearly central portion of the shaft and with splines 303d on the lower portion of the shaft. A rack 304a formed on a slider 304 is engaged with the pinion 303c. The slider 304 is shaped as U when it is seen vertically, as shown in FIG. 22. Both the sides of the slider 304 are located in sliding contact with a guide member 305 provided on the inside surface of the case 301. The guide member 305 is made of a synthetic resin of high resistance to wear and engaged with the case 301 and the bearings 302 so that the guide member is kept in a prescribed position. The guide member 305 has a partition wall 305a for preventing a pair of helical coil springs 310 from interfering with each other when they are elongated. When the slider 304 slides, it is guided on the top thereof by the ribs 306a, 306b and 306c of a guide member 306 provided on the inside surface of the case 301 and is guided on the bottom of the slider by a guide disk 307 unmovably fitted on the pivot pin 303. In other words, the slider 304 is guided by the guide members 305 and 306 and the guide disk 307, as shown in FIG. 24, so that the slider is straightly moved. A spring stopper 309 is provided at the right-hand end—as to FIGS. 22 and 23—of the case 301 so that the stopper is made unmovable by a stay 308. The helical coil springs 310 are resiliently interposed between the spring stopper 309 and one end 304d of the slider 304. The splines 303d of the pivot pin 303 are engaged with a partiallyvortical gear 311 of large diameter. The gear 311 is composed of two gears manufactured by punching steel plates. As shown in FIG. 22 the radius of the toothed portion of the gear 311 is gradually increased clockwise as to FIG. 22. A support shaft 312 is secured to the case 301. A quill 314 is rotatably supported with an interposed synthetic resin sleeve 313 on the support shaft 312. A partially vortical gear 315 of small diameter and an overdrive gear 316 are coupled by splines to the quill 314 at the lower and upper ends 314a and 314b thereof, respectively. The radius of the toothed portion of the partially vortical gear 315 is gradually increased clockwise as to FIG. 22. The gear 315 is always engaged with the other partially-vortical gear 311. Each of the gears 315 and 316 is composed of two punched steel plates.

Figure 28:
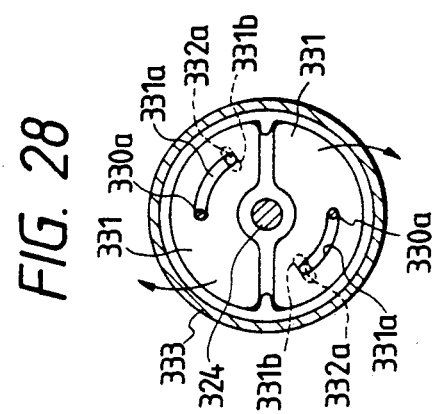
FIG. 28 is a sectional view of a major part of the brake means of the door check.

A support shaft 317 is secured to the case 311 and supports a one-way clutch 318 which is a spring clutch and comprises a small-diameter drive gear 319 engaged with the overdrive gear 316, a helical spring 320, and a driven gear 321 which is a worm wheel. The drive gear 319 is supported with an interposed synthetic resin sleeve 322 on a shaft. The helical spring 320 is interposed between the cylindrical portion 319 and that 321a of the driven gear 321 and acts so that the rotation of the drive gear is transmitted to the driven gear when the drive gear is rotated in such a direction is to close the door but that the rotation of the drive gear is not transmitted to the driven gear when the drive gear is rotated in the direction reverse to the former. A metal sleeve 323 is provided between the helical spring 320 and the inside circumferential surface of the cylindrical portion 321a of the driven gear 321. The teeth 321b of the driven gear 321 are engaged with a worm 324 rotatably supported at both the thin end portions thereof by bearings 326 and 327 secured to a plate 325. When the pivot pin 303 is rotated in such a direction as to close the door, the rotation of the shaft is transmitted to the worm 324 through the partially vortical gears 311 and 315, the overdrive gear 316, the drive gear 319 and the driven gear 321 which constitute a speed increase gear train. The partially vortical gears 311 and 315 constitute a pair of gears for changing the speed increase ratio in the gear train. The worm 324 is provided with a brake means 340 comprising an adjusted gear 328 secured to the worm 324 and having a notch 328a in the peripheral portion of the gear, a friction shoe 329, a rotation preventive disk 330 rotatably mounted on the worm, friction plates 331 engaged with pins 330a formed on the disk as shown in FIG. 28, a friction plate support member 332 which is a plate and is formed with pins 332a for the friction plates and secured to the worm and whose movement in the axial direction of the support member is restricted by an E-shaped ring, and a brake cup 333 secured to the plate 325 and surrounding the friction plates. As shown in FIG. 28, the friction plates 331 have arc-shaped holes 331a at the side of the rotation preventive disk 330, and arc-shaped grooves 331b at the side of the support member 332. An adjusting shaft 334 is movably fitted in the bent portions 325a and 325b of the plate 325. One end 334a of the adjusting shaft 334 faces the hole 301a of the case 301. An adjusting gear 335 is secured to the adjusting shaft 334 at the other end 334b thereof so that the gear can be engaged with and disengaged from the adjusted gear 328. A spring 336 urges the adjusting shaft 334 to move in such a direction as to disengage the adjusting gear 335 and the adjusted gear 328 from each other.

Figure 26:
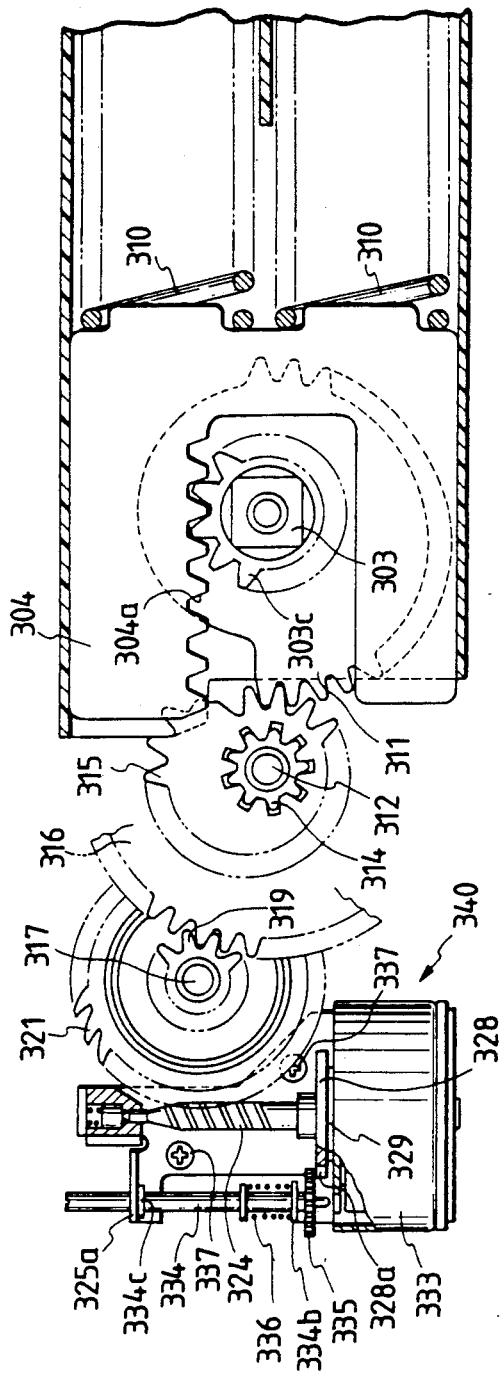
FIG. 26 is a vertical sectional view of the door check in the state that a door is closed.
Figure 27:
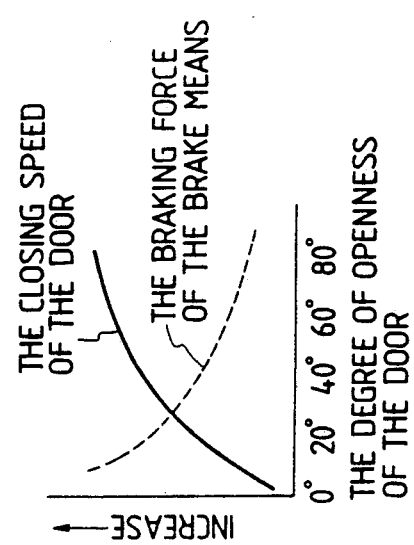
FIG. 27 is a graph indicative of the relationship between the degree of openness of the door and the closing speed thereof and that between the degree of openness thereof and the braking force of the brake means.

The operation of the door check is described in detail from now on. FIG. 22 shows that the slider 304 and the partially vortical gears 311 and 315 in the state that the door not shown in the drawing is opened. In that state, the large-diameter portion of the partially vortical gear 315 is engaged with the small-diameter portion of the other partially vortical gear 311, and the slider 304 is moved through the action of the pinion 303c and that of the rack 304a so that the springs 310 are compressed and urge the slider in such a direction as to close the door. When the force keeping the door opened is removed, the self-restoring forces of the springs 310 act to move the slider 304 leftward as to FIG. 22 so that the rack 304a rotates the pivot pin 303 counterclockwise as to FIG. 22 through the action of the pinion 303c. As a result, the door begins to turn in such a direction as to close, because of the action of the link coupled to the pivot pin 303. The rotation of the pivot pin 303 is transmitted to the partially vortical gear 315 through the other partially vortical gear 311 in such a manner that the rotation speed of the gear 315 is higher than that of the pivot pin. The ratio of the rotation speed of the gear 315 to that of the pivot pin 303 increases according as the door turns in the direction to close. The rotation of the partially vortical gear 315 is transmitted to the drive gear 319 of the one-way transmission clutch 318 through the overdrive gear 316 so that the drive gear is rotated at a higher speed than the partailly vortical gear. The rotation of the drive gear 319 is transmitted to the driven gear 321 through the spring 320 so that the driven gear is rotated. Since the driven gear 321 is engaged with the worm 324, the worm is rapidly rotated. When the rotation speed of the worm 324 has reached a prescribed level, the friction plates 331 are swung, by centrifugal force so that the friction plates rub the inside circumferential surface of the brake cup 333 to brake the rotation of the worm. Thus, a braking force acts to the pinion 303c or the pivot pin 303 through the speed increase gear train so as to brake the door turning in the direction to close. FIG. 26 shows that the member of the door closer are in the state that the door not shown in the drawings is closed. In that state, the large-diameter portion of the partially vortical gear 311 and the small-diameter portion of the other partially vortical gear 315 are engaged with each other. When the engagement of the gears 311 and 315 changes from the state shown in FIG. 22 to that shown in FIG. 26, the gear ratio of the gear 311 to the other gear 315 increases gradually. For that reason, the ratio of the rotation speed of the pivot pin 303 to that of the partially vortical gear 315 increases accordingly as the door turns in the direction to close. Consequently, the braking force of the brake means 340 strengthens accordingly as the angle of openness of the door decreases. When the braking force of the brake means 340 strengthens, the rotation speed of the pivot pin 303 is lowered. Therefore, the closing speed of the door falls accordingly as the angle of openness thereof decreases, as shown in FIG. 27. When the door is closed the partially vortical gears 311 and 315 are stopped as they remain engaged with each other, as shown in FIG. 26.

When the door is opened, the pivot pin 303 is rotated clockwise as to FIG. 26 and the slider 304 is moved rightward as to FIG. 26 through the action of the rack 304c engaged with the pinion 303c of the pivot pin, so that the springs 310 are compressed. At that time, the partially vortical gear 311 is rotated clockwise so that the other partially vortical gear 315 engaged therewith is rotated counterclockwise. The counterclockwise rotation of the gear 315 is results in rotating the drive gear 319 clockwise through the action of the overdrive gear 316. Since the rotation of the drive gear 319 at the time of the opening of the door is not transmitted to the driven gear 321 through the action of the spring 320, the worm 324 is not rotated. For that reason, the brake means 340 is not put in action when the door is opened. In other words, the door is opened without being loaded by the brake means.

In a door check provided according to the present invention, incompletely circular gears are engaged with each other in a speed increase gear train so that the speed increase ratio between the gears augments when a door turns in such a direction as to close. Since the gears are engaged with each other along much of the circumference of each of them, the gears are prevented from being very nonuniformly worn. For that reason, the speed of the closing of the door is stably maintained as predetermined. Since the degree of freedom of the change in the pattern of the closing speed of the door can be heightened by altering the from of the partially vortical gears, it is easy to meet the desire of the user of the door check.

We claim:

1. A door check for closing a door, comprising:
    a first pivot pin rotatable in response to the opening and closing of said door;
    a slider adapted to be linearly moved by the rotations of said pivot pin and to rotate said pivot pin during the closing of said door;
    a first coil spring for biasing said slider in a door closing direction;
    a worm;
    a gear train connected to said worm at a final stage thereof for speeding up the rotations of said worm relative to the rotation of said pivot pin;
    brake means for applying a braking force to said worm; and
    a one-way transmission clutch for operating said brake means in said door closing direction,
    said one-way transmission clutch comprising a second coil spring disposed in the gear train, to attendantly provide a door check which is substantially noiseless during opening and closing of said door.

2. A door check according to claim 1, wherein said brake means includes a speed adjusting structure.

3. A door check according to claim 1, wherein said brake means includes an electric power generator.

4. A door check according to claim 1, wherein said first coil spring includes two coil spring elements juxtaposed substantially in a vertical plane.

5. A door check according to claim 1, further comprising a transmission member through which said slider transmits its displacement to said gear train.

6. A door check according to claim 5, further comprising return means for causing said transmission member to follow the movement of said slider in the door opening direction.

7. A door check according to claim 5, further comprising two engagement portions formed in said slider and said transmission member for switching the braking force in the course of the door closing operation.

8. A door check according to claim 1, wherein said one-way transmission clutch operates so as to disengage said brake means when said door is moved in a door opening direction.

9. A door check according to claim 1, wherein a rotating center axis of said first pivot pin is disposed perpendicular to axes of said gear train.

10. A door check according to claim 9, wherein said slider is provided with two rack portions to define a right angle therebetween, one rack portion is meshed with a tooth portion of said first pivot pin and the other is meshed with a tooth portion of said gear train.

11. A door check according to claim 1, further comprising:
    a second pivot pin for making a gear train member rotatable, said pivot pin having a sleeve being made of synthetic resin, and said gear train member being made of metal.

12. A door check according to claim 1, wherein said first coil spring is displaced on one side of said first pivot pin, and said gear train and brake means are displaced on an opposite side of said first pivot pin.

13. A door check comprising a pivot pin which is rotated in conjunction with the opening and closing of a door; a slider which is straightly moved in conjunction with the rotation of said pivot pin; a means for urging said slider to rotate said pivot pin in such a direction as to close said door; a speed increase gear train which transmits the rotation of said pivot pin in such a manner that the rotation speed of the rotation output portion of said train is made higher than that of the rotation input portion thereof; a brake means provided at said rotation output portion; a one-way clutch provided in said train so as to transmit one the rotation of said train to said brake means only when said door closes; and a control means for controlling the movement of said slider so as to change the closing speed of said door along with the change in the angle of openness of said door, wherein the control means is a pair of partially vortical gears provided in the speed increase gear train.

14. A door check according to claim 13, wherein the control means is provided between the brake means and the slider.

15. A door check according to the claim 13, wherein the control means is a cam formed on the joint of the slider and the speed increase gear train.

16. A door check according to the claim 13, 14, or 15, characterized in that the one-way clutch transmits the rotation of the speed increase gear train to the brake means through a helical coil spring.

17. A door check according to claim 13, wherein the speed increase ratio between the pair of partially vortical gears varies as the door closes.

18. A door check comprising a pivot pin which is rotated in conjunction with the opening and closing of a door; a slider which is straightly moved in conjunction with the rotation of said pivot pin; a means for urging said slider to rotate said pivot pin in such a direction as to close said door; a speed increase gear train which transmits the rotation of said pivot pin in such a manner that the rotation speed of the rotation output portion of said train is made higher than that of the rotation input portion thereof; a brake means provided at said rotation output portion; a one-way clutch provided in said train so as to transmit the rotation of said train to said brake means only when said door closes; and a control means for controlling the movement of said slider so as to change the closing speed of said door along with the change in the angle of openness of said door, wherein the one-way clutch transmits the rotation of the speed increase gear train to the brake means through a helical coil spring.

19. A door check for closing a door, comprising:
a first pivot pin rotatable in response to the opening and closing of said door;
a slider adapted to be linearly moved by the rotations of said pivot pin and to rotate said pivot pin during the closing of said door;
a first coil spring for biasing said slider in a door closing direction;
a worm;
a gear train connected to said worm at a final stage thereof for speeding up the rotations of said work relative to the rotation of said pivot pin;
brake means for applying a braking force to said worm; and
a one-way transmission clutch for operating said brake means in said door closing direction,
said one-way transmission comprising a second coil spring disposed in the gear train, wherein a rotating center axis of said first pivot pin is disposed perpendicular to axes of said gear train.

* * * * *